United States Patent [19]

Furukawa et al.

[11] 3,970,608

[45] July 20, 1976

[54] EPOXIDIZED ACETYLENE-CONJUGATED DIENE RANDOM COPOLYMER AND THE CURABLE COMPOSITION COMPRISING THE SAME

[75] Inventors: Junji Furukawa, Kyoto; Eiichi Kobayashi, Uji; Takahiro Kawagoe, Tokorozawa, all of Japan

[73] Assignee: Bridgestone Tire Company Limited, Tokyo, Japan

[22] Filed: Mar. 31, 1975

[21] Appl. No.: 563,826

[30] Foreign Application Priority Data
Apr. 5, 1974  Japan................................. 49-37993
Apr. 5, 1974  Japan................................. 49-37994

[52] U.S. Cl.................................. 526/19; 526/53; 526/283; 526/339
[51] Int. Cl.².............. C08F 236/04; C08F 236/06; C08F 236/08; C08F 238/02
[58] Field of Search................. 260/85.3 R, 85.3 C, 260/87.5 R; 450/610.5, 623

[56] References Cited
UNITED STATES PATENTS
3,919,184   11/1975   Furukawa et al. ......... 260/85.3 R X Primary Examiner—William F. Hamrock
Attorney, Agent, or Firm—Stevens, Davis, Miller & Mosher

[57] ABSTRACT

An epoxidized acetylene-conjugated diene random copolymer, of which epoxy equivalent is within the range of from 50 to 1,000, is obtained by epoxidizing an acetylene-conjugated diene random copolymer, in which acetylene and conjugated diene are bonded linearly and randomly, the block character P is within the range of from 0.8 to 1.2 and the acetylene content is less than 60 mol%, with an organic peracid. The epoxidized acetylene-conjugated diene random copolymer is more reactive than the crude random copolymer and yields an excellent film, a coating material or a shaped article. Further by adding some of curing agents to the epoxidized acetylene-conjugated diene random copolymer, the cure rate of the epoxidized copolymer is fairly enhanced.

6 Claims, 1 Drawing Figure

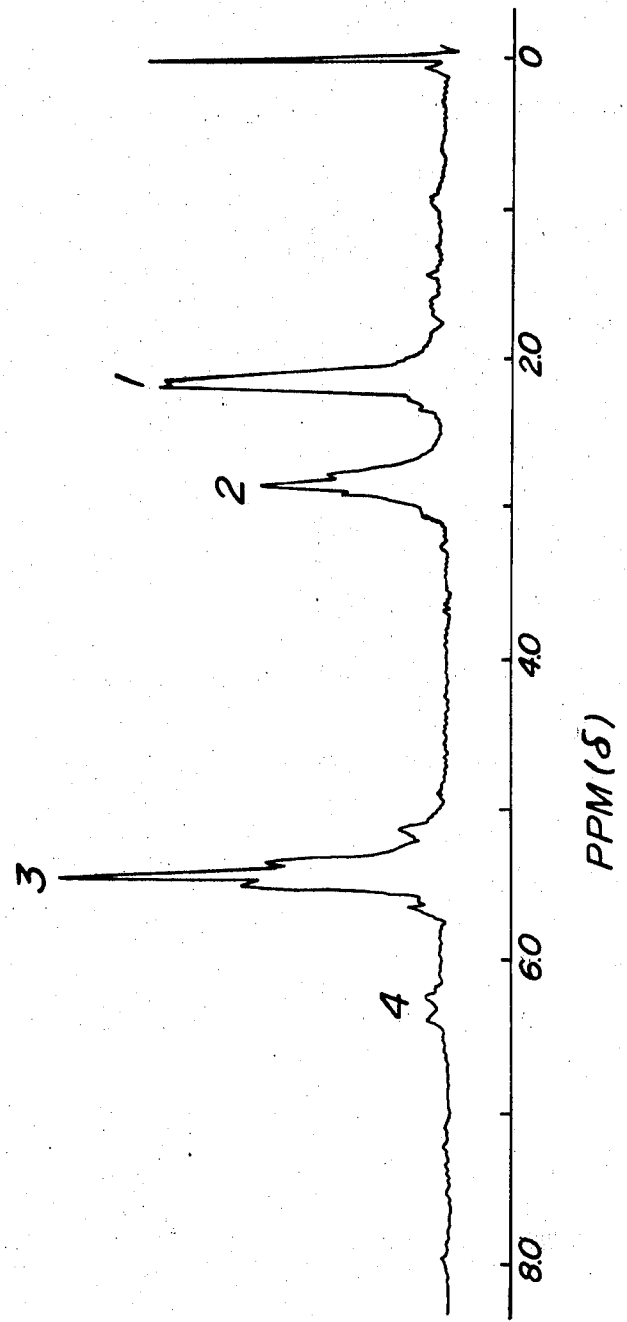

EPOXIDIZED ACETYLENE-CONJUGATED DIENE RANDOM COPOLYMER AND THE CURABLE COMPOSITION COMPRISING THE SAME

BACKGROUND OF THE INVENTION

1. Field of the Invention

The present invention relates to an epoxidized acetylene-conjugated diene random copolymer, of which epoxy equivalent is within the range of from 50 to 1,000, and the curable composition comprising the same.

2. Description of the Prior Art

There have hitherto been known epoxidized products of conjugated diene polymers, such as polybutadiene and the like.

The conventional epoxidized polybutadiene is produced, for example, by reacting polybutadiene with oxygen under oxidation conditions or organic peracid. Though the resulting epoxidized polybutadiene is curable with a proper curing agent for epoxy group, the curing rate and efficiency are not satisfactorily high for various uses, for example, as vehicles, drying oils and base materials of coating or laminate compositions.

It has been well known that acetylene and conjugated diene compounds are considerably different in the polymerization reactivity and therefore the copolymerization of these compounds is very difficult. In general, when the copolymerization reacton is effected in a combination of the monomers having considerably different polymerization reactivities, a mixture of homopolymers of both the monomers or a block copolymer is obtained. For example, Italian Pat. No. 665,277 discloses a method for copolymerizing acetylene and butadiene into a block copolymer.

The random copolymers of acetylene and a conjugated diene compound to be used in the present invention are quite novel copolymers in which acetylene and a conjugated diene compound are bonded linearly and randomly. These copolymers are novel compounds in which the conjugated diene compound units have 1,4-bonds. The 1,4-bonds have cis-type and trans-type but when the conjugated diene is, for example, butadiene or isoprene, these compounds are bonded substantially in cis-type, while in the case of 2,3-dimethylbutadiene, the compound is bonded substantially in trans-type and either cis-type or trans-type is formed. The copolymers in which acetylene and the conjugated diene compound are bonded in a linear random and the conjugated dienes are bonded in either cis-1,5-bond or trans-1,4-bond have never been known and the method for producing said copolymers also has never been known. The inventors have found that the epoxidized acetylene-conjugated diene random copolymer prepared by the present invention shows the more fast curing rate than that of the epoxidized polydiene, and yields the excellent films, coating surfaces and shaped articles.

SUMMARY OF THE INVENTION

According to the present invention, there is provided an epoxidized acetylene-conjugated diene random copolymer, of which epoxy equivalent is within the range of from 50 to 1,000, by epoxidizing an acetylene-conjugated diene random copolymer, in which acetylene and conjugated diene are bonded linearly and randomly, the block character P is within the range of from 0.8 to 1.2 and the acetylene content is less than 60 mol%, with an organic peracid.

According to another aspect of the present invention, there is provided an epoxidized acetylene-conjugated diene random copolymer composition which comprises 100 parts by weight of said epoxidized acetylene-conjugated diene random copolymer and 0.001 to 1,000 parts by weight of a curing agent.

It is an object of the present invention to provide a novel base material having excellent curing characteristics. The resulting novel epoxidized random copolymer is useful for many industrial fields, for example, vehicles of paint, base materials of coating materials, laminate materials and ingredients for plastic or rubber composition.

The epoxidized acetylene-conjugated diene random copolymer according to the present invention has two active groups of diallyl type methylene group and epoxy group, each of which is cured by oxygen in air or by a curing agent for epoxy group, and shows excellent physical properties after curing.

The curing rate of the epoxidized copolymer of the present invention is faster than that of well known epoxidized polyolefins or crude acetylene-conjugated diene random copolymers owing to the above described two kinds of cross-linking species.

The epoxidized copolymer of the present invention also shows excellent adhesive properties to metal or glass surface.

Further object of the present invention is to provide a curable composition which comprises 100 parts by weight of the epoxidized copolymer of the present invention and 0.001 to 1,000 parts by weight of the curing agent selected from the group consisting of a promotor for oxidation cure and the curing agent for epoxy group. The oxidation cure denotes the cure of polymer induced by excited species with oxygen.

These two kinds of curing agents prompt remarkably the cure rate of the epoxidized copolymer of the present invention. The method of producing the epoxidized copolymer of the present invention is limited to the epoxidation of the crude copolymer by means of an organic peracid.

BRIEF EXPLANATION OF THE DRAWING

The single FIGURE is one embodiment of the nuclear magnetic resonance spectrum of the acetylene-butadiene random copolymer to be used in the present invention.

DETAILED DESCRIPTION OF THE PREFERRED EMBODIMENT

The epoxidized acetylene-conjugated diene random copolymer according to the present invention is prepared by epoxidizing acetylene-conjugated diene random copolymer with an organic peracid.

The acetylene-conjugated diene random copolymer to be used in the present invention is obtained by copolymerizing acetylene with conjugated diene in the presence of the catalyst consisting of (i) dialkyluminum chloride and (ii) organic acid salt of nickel or organic complex compound of nickel (wherein the molar ratio of (i) to (ii) is within the range of 1 to 100) (filed on Nov. 19, 1973 by the same applicant, U.S. patent Ser. No. 417,205).

The conjugated diene, which is one component monomer of the acetylene-conjugated diene random copolymer to be used in the present invention, is a compound having the following general formula $H_2C=CR^1-CR^2=CH_2$ wherein $R^1$ and $R^2$ represent hydrogen atoms or hydrocarbon residues having 1–6 carbon atoms. Among the conjugated dienes, butadiene, isoprene and 2,3-dimethylbutadiene are preferable.

The acetylene-conjugated diene random copolymer having an acetylene unit content of 1–60 mol% may be used in the present invention. However, the random copolymer having an acetylene unit content of 5–50 mol% is preferable for the purpose of the present invention. When the acetylene unit content is less than 5 mol%, the curing rate of the epoxidized copolymer is lower, and when the content is more than 50 mol%, side reactions occur significantly on the epoxidation. Therefore, the random copolymer having an acetylene unit content outside the above described range is not preferable in the present invention. The random copolymer is entirely different in the property from conjugated diene homopolymer, acetylene homopolymer and acetylene-conjugated diene block copolymer.

It is necessary that the copolymer to be used in the present invention is a so-called random copolymer wherein the acetylene unit and the conjugated diene unit are distributed statistically randomly in the polymer chain depending upon the contents of respective units. The block character P, which is used as a measure of randomness of copolymer, is defined as follows in the case of, for example, acetylene-butadiene random copolymer.

The single FIGURE is one embodiment of the nuclear magnetic resonance spectrum of the acetylene-butadiene copolymer to be used in the present invention, which is measured in a deuterochloroform solution at 60 MHz and at room temperature by using tetramethylsilane as an internal standard. In the case when butadiene is bonded in 1,2-type, an absorption due to $=CH_2$ protons of $-CH=CH_2$ appears at 4.80–5.01 $\delta$. However, since this absorption does not substantially appear in the nuclear magnetic resonance spectrum of the copolymer of the present invention, the copolymer has substantially no 1,2-bond, and substantially all of the butadiene units are bonded in 1,4-type. Furthermore, since it is confirmed from the infrared absorption spectrum that almost all of the double bonds are present in cis-type in the copolymer, butadiene is copolymerized in cis-type. The nuclear magnetic resonance spectrum of the copolymer has four main absorptions, and the absorptions are assigned as shown in the following Table.

| Peak No. | δ-Value (ppm) | Assignment |
|---|---|---|
| 1 | 2.12 | $-CH_2-CH_2-CH=CH-$ |
| 2 | 2.82 | $-CH=CH-CH_2-CH=CH-$ |
| 3 | 5.40 | $-CH_2-C\underline{H}=C\underline{H}-CH_2-$ |
| 4 | ~6.30 | $-CH_2-C\underline{H}=C\underline{H}-CH=CH-CH_2-$ |

The peak at 2.12 $\delta$ is assigned to methylene protons of butadiene unit of the butadiene-butadiene diad, which are shown by $\underline{H}$ in the following formula.

$-CH_2-CH=CH-C\underline{H}_2\!\!\mid\!\!C\underline{H}_2-CH=CH-CH_2\!\mid$

The peak at 2.82 $\delta$ is assigned to methylene protons of butadiene unit of the acetylene-butadiene diad, which are shown by $\underline{H}$ in the following formula:

$\mid CH=CH\mid C\underline{H}_2-CH=CH-CH_2\mid$

This peak shows that acetylene and butadiene are copolymerized.

The peak at 5.40 $\delta$ is assigned to methine protons of butadiene unit and those of acetylene unit isolated by butadiene units, which are shown by $\underline{H}$ in the following formulae:

$\mid CH_2-C\underline{H}=C\underline{H}-CH_2\mid$ and $\mid CH_2-CH=CH-CH_2\mid C\underline{H}=C\underline{H}\mid CH_2-CH=CH-CH_2\mid$ The broad and very low peak at ~6.30 $\delta$ is assigned to methine protons of acetylene unit of the acetylene-acetylene diad, which are shown by $\underline{H}$ in the following formula:

$\mid C\underline{H}=C\underline{H}\mid C\underline{H}=C\underline{H}\mid$

Since no peak is observed in a field lower than this peak, it can be seen that three or more acetylene sequences are substantially absent in the copolymer. That is, it can be seen that acetylene is not bonded to form blocks.

The molar fraction of acetylene unit in the copolymer can be calculated from the following formula:

$$A = 1 - (R/2)$$

In the formula,
$A$ : molar fraction of acetylene unit in the copolymer.

$$R : \frac{(\text{area at } 2.12\delta) + (\text{area at } 2.82\delta)}{(\text{area at } 5.40\delta) + (\text{area at } 6.30\delta-\delta)}$$

Then, it can be determined by the diad fractions of monomer unit sequences whether the copolymer is random or block, said diad fractions being calculated from the following formulae:

$$F_{BB} = \frac{B}{1+R'}$$

$$F_{AB} = 2R' \cdot F_{BB}$$

$$F_{AA} = 1 - (F_{AB} + F_{BB})$$

In the above formulae,
$F_{BB}$: diad fraction of the butadiene-butadiene sequence,
$F_{AB}$: diad fraction of the acetylene-butadiene sequence,
$F_{AA}$: diad fraction of the acetylene-acetylene sequence,
$B$ : molar fraction of butadiene unit in the copolymer ($B=1-A$), $$R' : \frac{\text{area at } 2.82\delta}{\text{area at } 2.12\delta}$$

The diad fractions of the copolymer of the present invention calculated in this manner were substantially agreed with the following theoretical values when it was assumed that acetylene and butadiene were randomly copolymerized.

$$F_{BB} = B^2$$

$$F_{AB} = 2AB$$

$$F_{AA} = A^2$$

Therefore, it was found that the copolymer of the present invention was a random copolymer of acetylene and butadiene.

Furthermore, the block character P, which is used as one of the measures of the randomness, is shown by the following formula.

$$P = \frac{F_{AB} \text{ (from experimental value)}}{F_{AB} \text{ (from random assumption)}}$$

P being 1 means random copolymer,
P being << 1 means block copolymer, and
P being >> 1 means alternating copolymer.

In the present invention, random copolymers having a block character P of 0.8–1.2, particularly 0.9–1.1, are preferably used. The more a random copolymer resembles a block copolymer in the structure, the more the resulting epoxidized copolymer becomes heterogeneous and gelled.

The epoxidation reaction of an acetylene-conjugated diene random copolymer is effected by dissolving said copolymer in an inert organic solvent and reacting said copolymer in the solution with an organic peracid. As the inert organic solvents, use may be made of aliphatic hydrocarbons, such as hexane, heptane, pentane, petroleum ether; aromatic hydrocarbons, such as benzene, toluene, xylene, ethylbenzene; alicyclic hydrocarbons, such as cyclohexane, methylcyclopentane, ethylcyclohexane; halogenated hydrocarbons, such as carbon tetrachloride, chloroform, dichloromethane, dichloroethane, dichloropropane, chlorobenzene.

As the organic peracids, use may be made of the peroxides of organic carboxylic acid, such as perbenzoic acid, peracetic acid, performic acid, perphthalic acid, percamphanic acid, perpropionic acid, perbutyric acid, pertrifluoroacetic acid.

The organic peracid to be used in the present invention may be previously prepared or synthesized in situ in the epoxidation reaction system. In the latter case, for example, the reaction is effected by reacting an organic carboxylic acid with hydrogen peroxide in the presence of a strong acid catalyst. As the strong acid catalysts, use may be made of inorganic or organic strong acids, such as sulfuric acid, phosphoric acid, trifluoroacetic acid, trichloroacetic acid, ethane sulfonic acid, borontrifluoride, p-toluene sulfonic acid, a strong acid type ion exchange resin.

An amount of the organic peracid to be used in the present invention is in the range of from 0.01 to 2 moles based on 1 mole of carbon-carbon double bond in the acetylene-conjugated diene random copolymer, more preferably in the range of from 0.1 to 1 mole.

The epoxidation reaction is effected ordinarily at −10° to 100°C, more preferably 0° to 70°C.

After the completion of the reaction, the reaction mixture is preferably washed with a large amount of water or a diluted alkaline aqueous solution to remove an excess amount of the organic acid, inorganic acid or organic peracid.

Thereafter, the resulting epoxidized copolymer is recovered by evaporating the polymer solution or precipitating the product in a large amount of non-solvent, such as methanol. Of course, the resulting polymer solution may be used to next procedure without any treatments.

The epoxy equivalent (molecular weight of polymer chain per one equivalent epoxy group) of the resulting product is determined according to King's method (hydrochloric acid-dioxane method, G. King Nature 164, 706 (1949)).

The epoxy equivalent of the product of the present invention depends upon the epoxidation reaction condition. For various uses, the products having epoxy equivalent ranging from 50 to 1,000, preferably from 100 to 400 have good physical properties after curing and show a fast curing rate.

The epoxidized acetylene-conjugated diene random copolymer obtained by the above described method is curable itself in a restricted condition, however, the curing rate becomes faster by compounding said epoxidized copolymer with a curing agent selected from the group consisting of the curing agent for epoxy group and the promotor for oxidation cure and the cured product having excellent physical properties can be obtained.

The curing agent for epoxy group to be used in the present invention is the compound which initiates curing at the epoxy group and yields cured product. The respective curing agents for epoxy group are 1. basic catalysts which initiate ring opening polymerization of epoxy compound, such as alkoxide, phenoxide, organic carboxylic acid salt, carbonate, oxide and hydroxide of alkali metal or alkali earth metal and tert.amines, such as trimethylamine, triethylamine, tripropylamine, tributylamine, N,N-dimethylbenzylamine N,N-dimethylcyclohexylamine, N-ethylmorpholine, α-pyrroline, N,N-dimethylaniline, N-(β-hydroxyethyl)amine, N-ethyl-3,5-dimethylmorpholine, 2-picoline, 3-picoline, 4-picoline, 2,4,-lutidine, 2,6,-lutidine, 4-methylquinoline, 2-methylquinoline, tetramethylguanidine, triethanolamine, dialkylaminoethanol, N, N,N,N′,N′-tetramethylpolymethylenediamine, N,N,N′,N′-tetramethyl-1,3-butanediamine, alkyl-tert.-monoamine, 2-dimethylamino-2-hydroxypropane, N,N′-dimethylpiperadine, N-methylmorpholine, hexamethylenetetramine, N,N-bis[(2-hydroxy)-propyl]piperadine, 1,4-diazadicyclo(2,2,2,)octane(-triethylenediamine), pyridine, pyrazine, quinoline, 1-hydroxyethyl-2-heptadecylglyoxalidine, α-methylbenzyldimethylamine, 2-(dimethylaminomethyl)phenol, 2,4,6-tris(dimethylaminomethyl)phenol and its tri-2-ethylhexylic acid salt; and the secondary amines yielding tertiary amine by reacting themself stoichiometrically with epoxy compound, such as N-methylpiperadine, piperidine, pyrrolidine, hydroxyethylpiperadine, morpholine, ethylmethylimidazole, 2. acidic catalysts which initiate ring opening polymerization of epoxy group selected from the group consisting of mineral acids, such as hydrochloric acid, sulfuric acid, phosphoric acid and ether or amine complex of boron trifluoride, and fluoroboric acid, and 3. the compounds which react stoichiometrically with epoxy group, such as the compounds having at least two active hydrogen in the molecule or acid anhydride compound. Such active hydrogen group may be carboxylic group, hydroxyl group, mercapto group, amino group, amido group, N-substituted amino group, N-substituted amido group, imino group, sulfone amido group, urethane group, urea group, burette group, allophanate group.

As the compounds having active hydrogen group, use may be made of aliphatic polyamines, such as linear or branched polymethylenediamine, polyetherdiamine, diethylenetriamine, triethylenetetramine, tetraethylenepentamine, pentaethylenehexamine, iminobispropylamine, bis-(hexamethylene)triamine, dimethylaminopropylamine, diethylaminopropylamine, aminoethylethanolamine, methyliminobispropylamine, bisaminopropyltetraoxaspiroundecane adduct, m-xylenediamine, tetrachloro-p-xylylenediamine, alicyclic polyamines such as menthanediamine, N-aminoethylpiperadine, 1,3-diaminocyclohexane, isophoronediamine, epoxy compound adduct of aliphatic polyamine, ethylene oxide or propylene oxide adduct of aliphatic polyamine, diaminoethylated polyamine, ketone substituted polyamine (ketimine), aromatic polyamines, such as m-phenylenediamine, 4,4'-methylenedianiline, benzidine, 4,4'-thiodianiline, diaminodiphenylether, diaminodiphenyl sulfone, 4,4'-bis-(o-toluidine), dianisidine, o-phenylenediamine, 2,4-toluenediamine, 4,4'-methylene-bis(2-chloroaniline), bis(3,4-diaminophenyl)sulfone, diaminodinitrile sulfone, 2,6-diaminopyridine, 4-methoxy-6-methyl-m-phenylene diamine, m-aminobenzylamine, polyaminostyrene, and their eutectic mixtures, adducts of aromatic polyamine with styrene oxide or with phenyl glycidyl ether, polycarboxylic acids, such as adipic acid, phthalic acid, glutaric acid, malonic acid, succinic acid, maleic acid, fumalic acid, oxalic acid, citraconic acid, itaconic acid, trimellitic acid, pyromellitic acid, cyclopentanetetracaarboxylic acid, dimer acid, polyacrylic acid, polyvalent phenols, such as resorcinol, catechol, hydroquinone, p-t-butylcatechol, saligenin, bisphenol-A, biphenol, trimethylolallyloxyphenol, trihydroxydiphenyldimethylethane, 4,4'-dihydroxybiphenyl, dihydroxydiphenylsulfone, phenol resin, polyols, such as ethyleneglycol, propyleneglycol, erythritol, pentaerythritol, mannitol, sorbitol, inositol, dipentaerythritol, salicylic acid, dicyandiamide, urea, melamine, polyacrylamide, urea resin, melamine resin, novolak resin, aniline-formaldehyde resin, polyamide resin, polysulfide resin.

As acid anhydride, use may be made of phthalic anhydride, succinic anhydride, itaconic anhydride, citraconic anhydride, alkenyl acid anhydride, dodecenyl succinic anhydride, tricarballylic anhydride, maleic anhydride, maleic anhydride adduct of linoleic acid, copolymer of maleic anhydride with vinylether, copolymer of maleic anhydride with styrene, maleic anhydride adduct of conjugated diene polymer, maleic anhydride adduct of acetylene-conjugated diene random copolymer, maleic anhydride adduct of natural fat, maleic anhydride adduct of methylcyclopentadiene, methyl-2-substituted butenyltetrahydrophthalic anhydride, hexahydrophthalic anhydride, tetrahydrophthalic anhydride, methyltetrahydrophthalic anhydride, pyromellitic anhydride, cyclopentane tetracarboxylic anhydride, benzophenone tetracarboxylic anhydride, ethyleneglycol, bis-trimellitate, trimellitic anhydride, dodecylsuccinic anhydride, dichlorosuccinic anhydride and their eutectic mixtures. The compounding amount of the curing agent for epoxy group to the epoxidized copolymer of the present invention is determined according to the object to be used. Generally, the weight ratio of the curing agent to the epoxidized copolymer is within the range of from 0.1 to 1,000 parts by weight, preferably from 0.2 to 500 parts by weight based on 100 parts by weight of the epoxidized copolymer.

Among the curing agents for epoxy group, the compounds of the group (1) and (2) act catalytically to epoxy curing and appreciably a small amount of said compounds may be used, that is, from 0.1 to 10 parts by weight, preferably from 0.2 to 5 parts by weight based on 100 parts by weight of the epoxidized copolymer. When less than 0.1 part of said compound is used, the curing rate is too late to get satisfactory results. On the contrary, in the use of an excess amount of said compounds, the curing rate is too fast to keep appropriate mixing and shaping time and the resulting compositions are apt to become heterogeneous. The presence of the large amount of the catalyst residue in the composition may also affect its physical properties.

The amount of the curing agent of group (3) to be used is selected according to the values of the epoxy equivalent of the epoxidized copolymer.

Accordingly, the curing agent of group (3) may be used from 10 to 1,000 parts by weight based on 100 parts by weight of the epoxidized copolymer.

The epoxidized copolymer of the present invention reacts, as described above, with oxygen at the position of the activated methylene group and yields peroxide and forms excited species which causes successively oxidation cure.

The cure rate accelerates markedly with addition of a promotor of oxidation curing.

As a promotor, use may be made of metal compounds, such as cobalt, manganese, iron, lead, zinc, calcium compounds. More precisely, mention may be made of the above described metal oxides, hydroxides, halides, nitrates, carbonates, sulfates, other inorganic acid salts, acetates formates, octoates, oleates, stearates, oxalates, lactates, benzoates, linoleates, linolenates, naphthenates, resinates, abietates, fatty acid salts of linseed oil, fatty acid salts of soybean oil and organic complex compounds, such as acetylacetonates, cyclopentadienyl compounds.

The amount of the promotor for oxidation cure to be used in the present invention is in the range of from 0.001 to 5 parts by weight, preferably from 0.01 to 0.5 parts by weight as weight of metal component of promotor based on 100 parts by weight of the epoxidized copolymer.

When using less than 0.001 parts by weight of the promotor, the additive effect for accelerating the curing rate is not recognized. When using an excess amount of the promotor, the curing rate becomes so fast that the workability for mixing or shaping becomes poor.

The epoxidized acetylene-conjugated diene random copolymer and the composition comprising the same as described above may be used for the base materials of paints, sealing materials, coating materials, laminates, films, casting materials and adhesives.

The epoxidized copolymer of the present invention and the composition comprising the same may also be compounded with a coloring agent, a filler or a diluent, etc. depending upon their utilities.

As a coloring agent, use may be made of inorganic one, such as titanium dioxide, red iron oxide, etc., organic one, such as Hansa Yellow G, Watchung Red, etc.

An amount of a coloring agent to be used in the present invention, if it is used, is ordinarily in the range of from 1 to 1,000 parts by weight based on 100 parts by weight of the epoxidized copolymer of the present invention.

As a filler, use may be made of inorganic materials, such as carbon black, zinc oxide, clay, magnesium carbonate, silica, silicate, calcium carbonate, diatomaceous earth, talc, mica, asbestos, graphite, pumice, macadam, sand, glass fiber, glass powder, carbon fiber, quartz powder, porcelain powder, alumina, silica gel, aluminum powder, iron oxide, iron powder, copper powder, antimony oxide, barium titanate, chalk, barite, lithopone and organic materials, such as cumarone-inden resin, high styrene-butadiene resin, cyclized rubber, synthetic fiber, natural fiber.

An amount of the filler to be used in the present invention, if it is used, is usually in the range of from 1 to 1,000 parts by weight based on 100 parts by weight of the epoxidized copolymer of the present invention.

As a diluent, use may be made of non-reactive diluent and reactive diluent. Non-reactive diluent includes solvent, plasticizer and so on.

The representative non-reactive diluents are exemplified as hydrocarbons, such as hexane, heptane, petroleum ether, solvent naphtha, terebene oil, mineral spirit, benzene, toluene, xylene, ethylbenzene, cyclohexane, hydrocarbon halides, such as carbon tetrachloride, chloroform, dichloromethane, dichloroethane, dichloropropane, tetrachloroethylene, chlorobenzene, ethers, such as methyl ether, ethyl ether, dioxane, tetrahydrofuran, dimethoxyethane, esters, such as ethyl acetate, butyl acetate, phthalic acid ester, phosphoric acid este, pine oil, coal tar and their mixtures.

A reactive diluent is a diluent which concerns the reaction of epoxy group of the epoxidized copolymer, such as styrene oxide octylene oxide, dodecene oxide, epichlorohydrin, butyl glycidyl ether, allyl glycidyl ether, phenyl glycidyl ether, cresyl glycidyl ether, diglycidyl ether, butanediol glycidyl ether, glycerine diglycidyl ether, vinyl cyclohexane dioxide, dipentene dioxide, epoxidized vegetable oil, glycidyl methacrylate, triphenyl phosphite, polyol, lactone.

An amount of such diluent to be used in the present invention, if it is used, is usually in the range of from 1 to 1,000 parts by weight based on 100 parts by weight of the epoxidized copolymer.

The epoxidized copolymer of the present invention is able to copolymerize with a compound having carbon-carbon double bond because of the presence of the active species on its polymer chain and co-vulcanize to yield a modified cured material having improved physical properties.

The compoud having carbon-carbon double bond is a raical polymerizable natural or synthetic compound or its modified compound.

As said compound, use may be made of natural drying oil, semi-drying oil, their modified oils, such as linseed oil, soybean oil, tung oil, fish oil, caster oil, coconut oil, hempseed oil, cotton oil, dehydrated caster oil, isomerized oil, styrenated oil, cyclopentadiene copolymer oil, maleinated oil, alkyd resin, such as drying oil-modified alkyd resin, resin-modified alkyd resin, styrenated alkyd resin, synthetic drying oil, such as unsaturated fatty acid esters of polyhydric alcohols, such as pentaerythritol or sorbitol, drying resin like materials, such as petroleum resin, natural rubber, synthetic rubber, such as polybutadiene, polyisoprene, polychloroprene, styrene-butadiene copolymer, acrylonitrile-butadiene copolymer, butadiene-propylene copolymer, butadiene-isobutylene copolymer, radical polymerizable monomer, such as styrene, α-methylstyrene, α-butylstyrene, αphenylstyrene, p-methoxystyrene, p-methylstyrene, p-isopropylstyrene, p-tert-butylstyrene, m-chlorostyrene, p-chlorostyrene, p-bromostyrene, p-fluorostyrene, p-cyanostyrene, p-phenoxystyrene, p-nitrostyrene, p-acylstyrene, p-dimethylaminostyrene, p-trimethylsilylstyrene, divinylbenzene, acrylonitrile, methacrylonitrile, acrylic acid, methacrylic acid, acrylic acid ester, such as methyl acrylate, ethyl acrylate, isopropyl acrylate, n-butyl acrylate, t-butyl acrylate, n-amyl acrylate, n-octyl acrylate, vinyl acrylate, allyl acrylate, phenyl acrylate, benzyl acrylate, cyclohexyl acrylate, methacrylic acid esters, such as methyl methacrylate, ethyl methacrylate, n-propyl methacrylate, i-propyl methacrylate, i-butyl methacrylate, n-butyl methacrylate, s-butyl methacrylate, t-butyl methacrylate, phenyl methacrylate, benzyl methacrylate, cyclohexyl methacrylate, tolytyl methacrylate, N- or N,N-substituted acrylamides, such as acrylamide, N-methylacrylamide, N-ethylacrylamide, N-n-butyl acrylamide, N-n-hexylacrylamide, N,N-dimethyl acrylamide, N,N-methylethyl acrylamide, thiolacrylic acid ester, thionacrylic acid ester, dithioacrylic acid ester, thioacrylic acid amide, N-substituted thioacrylic acid amide, N,N-disubstituted thioacrylic acid amide, thioacrylic acid, thionacrylic acid, dithioacrylic acid, vinyl esters, such as vinyl formate, vinyl acetate, vinyl propionate, vinyl caproate vinyl valerate, vinyl butyrate, vinyl benzoate, vinyl trimethylacetate, vinyl monochloroacetate, vinyl dichloroacetate, vinyl trichloroacetate, vinyl trifluoroacetate, allyl esters, such as allyl acetate, allyl propionate, allyl laurate, allyl benzoate, diallyl phthalate, vinyl pyridine, vinyl chloride, vinylidene chloride, vinyl bromide, vinylidene bromide, allyl chloride, vinyl isocyanate, methylvinyl ketone, vinylcyclobutene, vinylcyclohexane, allyl benzene, vinyl naphthalene, maleic acid, maleic anhydride dialkyl maleate, diallyl maleate, maleic imide, fumaric acid, dialkyl fumarate, diallyl fumarate, crotonic acid, silicon compound, such as (trimethyl siloxy) vinyldimethyl silane, bis-(trimethyl siloxy) vinyl methyl silane, tris-(trimethyl siloxy) vinyl silane, conjugated dienes, such as isoprene, chloroprene, pentadiene-1,3, hexadiene-1,3, dimethyl butadiene, non-conjugated dienes, such as, pentadiene-1,4, hexadiene-1,4, olefins, such as octene-1.

Among them, the compounds having high boiling point are preferable. An amount of the compound having carbon-carbon double bond to be used in the present invention, if it is used, is usually in the range of from 1 to 1,000 parts by weight based on 100 parts by weight of the epoxidized copolymer.

The following examples are given for the purpose of illustration of this invention and are not intended as limitations thereof. The parts, ratios and percents are by weight unless otherwise indicated.

EXAMPLE 1

A random copolymer of acetylene and butadiene was synthesized in the following manner. Into a glass reaction vessel of 1 l capacity, the interior of which was previously purged with nitrogen, were charged 350 ml of toluene and 15 mmoles of nickel naphthenate (in the form of a 0.5 mol/l hexane solution). The catalyst solution was kept at 30°C, added with 75 mmoles of diethylaluminum chloride (in the form of a 2 mol/l hexane solution) and further kept at 30°C for 10 minutes under stirring to age the catalyst. A gaseous mixture of acetylene (0.24 mol/hr.) and butadiene (0.45 mol/hr.) was introduced into the catalyst solution at 30°C for 3.5 hours to effect a polymerization reaction of the acetylene and butadiene. After the reaction, the reaction mass was poured into methanol to precipitate the reaction product. From the reaction product, 71 g of a chloroform-soluble copolymer was obtained.

The infrared absorption spectrum of the resulting copolymer was measured in a carbon disulfide solution, and the microstructure of the double bond of the copolymer was determined according to the Morero method (D. Morero et al, Chim. e. Ind., 41, 758 (1959)). As the result, it was found that the microstructure of the double bond of the copolymer was composed of 84% of cis-type bond, 10% of trans-type bond and 6% of vinyl-type bond. The copolymer had an intrinsic viscosity [n] of 0.1 in toluene at 30°C.

The composition and randomness of the copolymer were analysed in the following manner by the nuclear magnetic resonance spectrum. The copolymer was dissolved in deuterochloroform, and its nuclear magnetic resonance spectrum was measured at 60 MHz by using tetramethylsilane as an internal standard at room temperature. The nuclear magnetic resonance spectrum of the copolymer had four main peaks, which were assigned as follows.

The peak at 2.12 $\delta$ is assigned to methylene protons of butadiene unit of the butadiene-butadiene diad.

The peak at 2.82 $\delta$ is assigned to methylene protons of butadiene unit of the acetylene-butadiene diad.

The peak at 5.40 $\delta$ is assigned to methine protons of butadiene unit and those of acetylene unit isolated by butadiene units.

The broad and very low peak at ~6.30 $\delta$ is assigned to methine protons of acetylene unit of the acetylene-acetylene diad.

The peak at 2.82 $\delta$ indicates the presence of diallyl type active methylene structure, and the peak at ~6.30 $\delta$ indicates the presence of conjugated diene type structure.

The molar fraction of acetylene unit in the copolymer can be calculated from the following formula.

$$A = 1 - (R/2)$$

In the formula,
$A$ : molar fraction of acetylene unit in the copolymer $$R : \frac{(\text{area at } 2.21\delta) + (\text{area at } 2.82\delta)}{(\text{area at } 5.40\delta) + (\text{area at } 6.30\delta)}$$

From the measured value, $A$ was calculated to be 0.322. That is, the acetylene unit content of the copolymer was 32.2 mol%.

Then, it can be determined by the diad fractions of monomer unit sequences whether the copolymer is random or block, said diad fractions being calculated from the following formulae.

$$F_{BB} = \frac{B}{1+R'}$$

$$F_{AB} = 2R' \cdot F_{BB}$$

$$F_{AA} = 1 - (F_{AB} + F_{BB})$$

In the above formulae, $F_{BB}$: diad fraction of the butadiene-butadiene sequence, $F_{AB}$: diad fraction of the acetylene-butadiene sequence, $F_{AA}$: diad fraction of the acetylene-acetylene sequence, $B$ : molar fraction of butadiene unit in the copolymer ($B=1-A$), $$R' : \frac{\text{area at } 2.82\delta}{\text{area at } 2.12\delta}$$

The diad fractions of the copolymer calculated in this manner from the measured values were as follows.

$F_{BB} = 0.46$
$F_{AB} = 0.44$
$F_{AA} = 0.10$

While, if it is assumed that acetylene and butadiene are randomly copolymerized, the theoretical values of the diad fractions are as follows.

$F_{BB} = B^2 = 0.46$
$F_{AB} = 2AB = 0.44$
$F_{AA} = A^2 = 0.10$

Therefore, the measured values and the theoretical values of the diad fractions were agreed with each other very well, and it was found that the copolymer synthesized in this Example 1 was a random copolymer of acetylene and butadiene.

Further, in the copolymer, the above defined block character P was calculated as follows.

$$P = \frac{F_{AB} \text{ (from experimental value)}}{F_{AB} \text{ (from random assumption)}} = \frac{0.44}{0.44} = 1.00$$

Therefore, the copolymer was clearly a random copolymer.

An expoxidation reaction of the copolymer was effected in the following manner.

Into a flask equipped with a thermometer, a stirrer and a reflux condenser, 4.52 g of the copolymer was charged and dissolved in 50 ml of 1,2-dichloroethane. Then, 30.4 to 76.0 m equivalents of strong acidic type of ion exchange resin (Amberlite IR 120B, supplied with Organo Co. Ltd.) which was previously modified to H-type, and 20 to 50 mmoles of acetic acid were added thereto and then 40 to 100 mmoles of hydrogen peroxide (30% aqueous solution) was added successively.

Thereafter, the components were reacted under warming at 60°C for 2 hours. After the completion of the reaction, the reaction mixture was washed with water, then with saturated sodium bicarbonate aqueous solution and dried with magnesium sulfate, filtered and dried under vacuum to obtain the epoxidized acetylene-butadiene random copolymer. The epoxy equivalent of the obtained product was determined according to King's method to obtain four kinds of the epoxidized product as shown in Table 1.

The curing characteristics of the resulting epoxidized copolymer of the present invention were examined as follows.

That is, each sample was coated on a glass plate at about 30 $\mu$ thickness, then subjected to cure under air heated at 100°C for a given time, thereafter the degree of cure reaction was evaluated by weighing the residue after extraction by using toluene.

The obtained results are shown in Table 1.

The absorbed oxygen amounts of the epoxidized copolymer species after curing were about 15 to 25 parts by weight based on 100 parts by weight of the raw materials before curing.

Table 1

| Example No. or Comparative Example No. | Sample | Epoxy equivalent | Curing time (min.) | (Residue after extraction / Coated amount (%)) ×100 |
|---|---|---|---|---|
| Example 1 | Epoxidized acetylene-butadiene random copolymer[1] | 306 | 20 | 111 |
| | | " | 30 | 112 |
| | | " | 40 | 109 |
| | | 265 | 20 | 106 |
| | | " | 30 | 118 |
| | | " | 40 | 110 |
| | | 215 | 20 | 63 |
| | | " | 30 | 79 |
| | | " | 40 | 108 |
| | | 181 | 20 | 56 |
| | | " | 40 | 81 |
| | | " | 50 | 89 |
| Comparative Example 1 | Epoxidized 1,2-polybutadiene[2] | 373 | 20 | 0 |
| | | " | 40 | 0 |
| | | " | 50 | 0 |
| | | 238 | 20 | 0 |
| | | " | 40 | 0 |
| | | " | 50 | 0 |
| Comparative Example 2 | Epoxidized cis-1,4-polybutadiene[3] | 326 | 20 | 6 |
| | | " | 40 | 20 |
| | | " | 50 | 51 |
| | | 185 | 20 | 0 |
| | | " | 40 | 0 |
| | | " | 50 | 3 |

[1]acetylene content, 32.2 mol%, number average molecular weight 2,370.
[2]number average molecular weight 1,130.
[3]number average molecular weight 3,200.

As seen from the results of Table 1 the novel epoxidized copolymer according to the present invention has more excellent curing characteristics than that of well knownn epoxidized polybutadiene.

EXAMPLES 2 – 4

These examples show the addition effects of a promotor for oxidation cure.

The sample was coated on a glass plate in 30 μ thickness and subjected to cure in the presence of oxygen in air. As a sample,, the epoxidized acetylene-butadiene random copolymer used in Example 1 (acetylene content 32.2 mol%, number average molecular weight 2,370, block character P 1.00) and the epoxidized acetylene-butadiene random copolymers added with 0.05 weight % (as weight of metal based on the epoxidized random copolymer) of naphthenate of cobalt and manganese respectively, were used. The time for which the complete curing was effected, was determined by weighing the amount of toluene extraction residue.

The obtained results are shown in Table 2.

Table 2

| Example No. | Sample | Drying touch time | Time to complete curing |
|---|---|---|---|
| 2 | No addition | 24 hours | 1.5 days |
| 3 | Cobalt naphthenate | 40 min. | 2 hours |
| 4 | Manganese naphthenate | 60 min. | 3 hours |

COMPARATIVE EXAMPLES 3 – 8

As coating samples, the compositions of epoxidized 1,2-polybutadiene or epoxidized cis-1,4-polybutadiene added with cobalt or manganese naphthenate were used and the curing was effected by means of oxygen in the same manner as described in Examples 2 – 4.

The obtained results are shown in Table 3.

Table 3

| Comparative Example No. | Sample | Drying touch time | Time to complete curing |
|---|---|---|---|
| 3 | Epoxidized 1,2-polybutadiene[1] added with 0.1PHR[4] of cobalt naphthenate | 6 days | 10 days |
| 4 | Epoxidized 1,2-polybutadiene[1] added with 0.05PHR of manganese naphthenate | more than 20 days | — |
| 5 | Epoxidized cis-1,4-polybutadiene[2] added with 0.1PHR of cobalt naphthenate | 4 hours | 2 days |
| 6 | Epoxidized cis-1,4-polybutadiene[2] added with 0.05PHR of manganese naphthenate | 3 days | 5 days |
| 7 | Epoxidized cis-1,4-polybutadiene[3] added with 0.1PHR of cobalt naphthenate | 2.5 hours | 12 hours |
| 8 | Epoxidized cis-1,4-polybutadiene[3] added with 0.05PHR of manganese naphthenate | 30 hours | 2.5 days |

[1]Epoxidation product of 1,2-polybutadiene (number average molecular weight, 1,130), epoxy equivalent, 238
[2]Epoxidation product of cis-1,4-polybutadiene (number average molecular weight, 3,200), epoxy equivalent, 185
[3]Epoxidation product of cis-1,4-polybutadiene (number average molecular weight, 3,200), epoxy equivalent, 326
[4]PHR denotes weight parts of metal component of promotors based on 100 weight parts of epoxidized products.

Table 3 shows that the curing rates of these samples were slower than that of samples of Examples 3 to 4.

EXAMPLES 5 – 8

The curable compositions were prepared by compounding the epoxidized copolymer (epoxy equivalent, 215) used in Example 1 with various curing agents for epoxy group as shown in Table 4.

The curing was effected at 100°C in a form of slab plate having a thickness of 3 mm. The obtained results are shown in Table 4.

Table 4

| Example No. | Curing agent for epoxy group (PHR)[1] | Gelation time | Appearance of cured product |
|---|---|---|---|
| 5 | Maleic anhydride (22.8 PHR) | a few minutes | Completely cured after 2 hrs., showing resinous solid. |
| 6 | Hexahydrophthalic anhydride (35.8 PHR) | 30 min. | Completely cured after 17 hrs., showing elastomeric solid. |
| 7 | m-Xylylenediamine (31.6 PHR) | 30 min. | Completely cured after 19 hrs., showing elastomeric solid. |
| 8 | Borontrifluoride monoethylamine | 10 min. | Completely cured after 20 hrs., showing |

Table 4-continued

| Example No. | Curing agent for epoxy group (PHR)[1] | Gelation time | Appearance of cured product |
|---|---|---|---|
| | complex (2.0 PHR) | | elastomeric solid. |

[1]PHR denotes weight parts of curing agent based on 100 parts by weight of the epoxidized copolymer.

From the above results, it can be seen that the compositions according to the present invention are much more fast in the curing rate and more easily cured than those of the comparative examples as shown later.

COMPARATIVE EXAMPLES 9– 10

The epoxidized product (epoxy equivalent, 185) of cis-1,4-polybutadiene (number average molecular weight, 3,200) was compounded with the curing agents as shown in Table 5 and then cured in the same manner as shown in Example 5.

The results are shown in Table 5. The curing rates were far later than those of the epoxidized acetylene-butadiene random copolymer and the degrees of curing were not satisfactory under such temperature condition.

Table 5

| Comparative Example No. | Curing agent for epoxy group (PHR) | Gelation time (hrs.) | Appearance of cured product |
|---|---|---|---|
| 9 | Hexahydrophthalic anhydride (41.6) | 2 | Curing is not satisfactory after 20 hours. |
| 10 | m-Xylylenediamine (36.8) | more than 4 | Curing is not satisfactory after 20 hours. |

COMPARATIVE EXAMPLES 11 – 12

The epoxidized product (epoxy equivalent, 238) of 1,2-polybutadiene (number average molecular weight, 1,130) was compounded with each of curing agents as shown in Table 6 and cured under the same condition as described in Example 5. The results are shown in Table 6.

The curing rates of these samples were slower than those of Examples 5 – 8 and the degrees of curing were not satisfactory under such temperature condition.

Table 6

| Comparative Example No. | Curing agent for epoxy group (PHR) | Gelation time (hrs.) | Appearance of cured product |
|---|---|---|---|
| 11 | Hexahydrophthalic anhydride (32.4) | more than 4 | Curing is not satisfactory after 21 hours. |
| 12 | m-Xylylenediamine (28.6) | more than 4 | Curing is not satisfactory after 21 hours. |

EXAMPLE 9

A random copolymer of acetylene and isoprene was synthesized in the following manner. Into a glass reaction vessel of 300 ml capacity, the interior of which was previously purged with nitrogen, were charged 70 ml of toluene, 3 mmoles of nickel naphthenate (in the form of a 0.5 mol/l hexane solution) and 15 mmoles of diethylaluminum chloride (in the form of a 2 mol/l hexane solution) in this order. The catalyst was aged at 30°C for 10 minutes. After 0.39 mole of liquid isoprene was added to the catalyst solution, acetylene was introduced into the reaction solution at a constant rate at 30°C for 3 hours so that the total amount of the acetylene was 0.10 mole, whereby a copolymerization reaction of the acetylene and isoprene was effected. The reaction mass was precipitated in methanol to obtain a reaction product. From the reaction product, 19.1 g of a chloroform-soluble copolymer was obtained. The copolymer had an intrinsic viscosity of 0.1 at 30°C in toluene. It was ascertained from the nuclear magnetic resonance spectrum of the copolymer that the copolymer contained 33.6 mol% of acetylene units, and the acetylene and the isoprene are randomly copolymerized in the copolymer. The block character P was 1.04.

Into a flask equipped with a thermometer, a stirrer and a reflux condenser, 4.50 g of the above described copolymer was charged and dissolved in 50 ml of 1,2-dichloroethane. Then, 45.6 m equivalent of strong acid type ion exchange resin (Amberlite IR 120B, supplied with Organo Co. Ltd.) which has been previously converted into H-type and 30 mmoles of acetic acid were charged and further 60 mmoles of hydrogen peroxide (30% aqueous solution) was added dropwise. Thereafter, the reaction was continued for 2 hours at 60°C. After the completion of the reaction, the reaction product was washed with a large amount of water and saturated sodium bicarbonate aqueous solution, dried over magnesium sulfate, filtrated and dried under vacuum to obtain the epoxidized copolymer.

The epoxy equivalent of the epoxidized product was 232. A mixture of 100 parts of the resulting epoxidized copolymer and 50 parts of toluene was coated on a glass plate in about 30 μ thickness and cured in air at 100°C.

The completely cured and excellent coating film was obtained after curing for about 50 minutes.

EXAMPLES 10 – 11

To the epoxidized acetylene-isoprene random copolymer (epoxy equivalent, 232) prepared in Example 9, the promotors for oxidation cure and diluents were added and the obtained compositions were coated on a glass plate in 30 μ thickness, then cured in air at room temperature.

The obtained results are shown in Table 7.

Table 7

| Example No. | Promotor for oxidation cure (PHR) | Diluent (PHR) | Drying touch time (min.) | Time to complete curing (hrs.) |
|---|---|---|---|---|
| 10 | Cobalt naphthenate (0.1) | Benzene (55) | 45 | 6 |
| 11 | Manganese naphthenate (0.05) | Benzene (80) | 95 | 8 |

EXAMPLES 12 –13

To the epoxidized acetylene-isoprene random copolymer (epoxy equivalent, 232) prepared in Example 9, the curing agents for epoxy group as shown in Table 8 were compounded.

The obtained compositions were cured under the same condition as in Example 5.

The obtained results are shown in Table 8.

Table 8

| Example No. | Curing agent for epoxy group (PHR) | Gelation time (min.) | Appearance of cured product |
|---|---|---|---|
| 12 | Hexahydrophthalic anhydride (33.2) | 60 | Cured completely after 21 hrs., showing resinous solid. |
| 13 | m-Xylylenediamine (29.3) | 120 | Cured completely after 21 hrs., showing resinous solid. |

Each of the compositions showed fast curing rate.

EXAMPLE 14

Into a flask equipped with a thermometer, a stirrer and a reflux condenser, 3.00 g of acetylene-butadiene random copolymer (acetylene content 21.3%, block character P, 1.10, number average molecular weight 1980) was charged and dissolved in 30 ml of chloroform.

Under cooling the reaction flask with ice water, perbenzoic acid chloroform solution (2.83 g/70 ml chloroform) was added dropwise for about 30 minutes. Thereafter, the reaction system was warmed to 25°C and reacted for 15 hours. After the completion of the reaction, the reaction product was washed with diluted sodium hydroxide aqueous solution, then with pure water.

The solution was dried over magnesium sulfate, filtered and the resulting product was dried under vacuum. The epoxy equivalent determined according to hydrochloric acid - dioxane method was 198.

EXAMPLE 15

The epoxidation reaction of an acetylene-butadiene random copolymer was effected in the same manner as described in Example 1, except that 50 ml of benzene was used as a diluent instead of 1,2-dichloromethane. The epoxy equivalent of the resulting epoxidized copolymer was 265.

EXAMPLE 16

The epoxidation reaction was effected in the same manner as described in Example 1 except that 50 ml of carbon tetrachloride was used instead of 1,2-dichloroethane as a diluent.

The epoxy equivalent of the resulting epoxidized copolymer was 310.

EXAMPLE 17

The epoxidation reaction was effected in the same manner as described in Example 1 except that 45.6 m equivalents of strong acid type ion exchange resin (Amberlite IR 120B) which was converted to H type, 30 mmoles of acetic acid and 60 mmoles of hydrogen peroxide were used.

The epoxy equivalent of the resulting epoxidized copolymer was 227.

EXAMPLE 18

The epoxidation reaction was effected in the same manner as described in Example 1 except that 76.0 m equivalents of Amberlite IR 120B (Ion exchange resin, supplied with Organo Co., Ltd.), 50 mmoles of acetic acid and 100 mmoles of hydrogen peroxide were used.

The epoxy equivalent of the resulting epoxidized copolymer was 181.

EXAMPLE 19

The epoxidation reaction was effected in the same manner as described in Example 17 except that the reaction temperature was kept at 30°C and the reaction time was 4 hours. The epoxy equivalent of the resulting epoxidized copolymer was 410.

EXAMPLE 20

The epoxidation reaction was effected in the same manner as described in Example 17 except that the acetylene-butadiene random copolymer of which acetylene content was 23.7 mol%, block character P was 0.97 and the number average molecular weight was 1,840, was used. The epoxy equivalent of the epoxidized copolymer was 221.

EXAMPLE 21

This example shows that the adhesive property of an acetylene-conjugated random copolymer was remarkably improved by epoxidizing. The acetylene-butadiene random copolymer of which acetylene content was 32.2 mol%, block character P was 1.00 and the number average molecular weight was 2,370, was epoxidized. In epoxidation reaction, acetic acid — hydrogen peroxide — strong acid type ion exchange resin system was used. The resulting epoxidized copolymer was coated on a glass or aluminum plate in about 30 $\mu$ thickness and cured in air at a given temperature for a given time.

The following test was made as an indication of each sample to the aluminum or glass plate.

Eleven ditches were laid out crosswise at right angle at intervals of 1 mm on the specimen (the epoxidized copolymer coated surface) with a blade to make hundred measures, thereafter, the measures were covered with an adhesive tape and it was counted how much measures were peeled out (hereinafter called M-number) after the tape was peeled out.

The obtained results are shown in Table 9.

Table 9

| Sample | Epoxy equivalent | Cure condition temperature (C°) | time (hr.) | M-number Aluminum plate | Glass plate |
|---|---|---|---|---|---|
| Acetylene-butadiene random copolymer | — | 100 | 2 | 34 | — |
|  | — | 100 | 1 | — | 100 |
| Epoxidized random copolymer | 306 | 100 | 2 | 7 | — |
|  | 227 | 100 | 2 | 0 | — |
|  | 215 | 100 | 1 | — | 21 |
|  | 181 | 100 | 2 | 0 | — |

EXAMPLE 22

100 parts of an epoxidized product (epoxy equivalent, 221) of acetylene-butadiene random copolymer (acetylene content 23.7 mol%, block character P, 0.97, number average molecular weight 1,840) was compounded with 10 parts of red iron oxide and the resulting composition was coated on a glass plate in 30 $\mu$ thickness and cured in air at 100°C. Drying touch time of the sample was about 15 minutes and the sample was cured completely after about 35 minutes.

EXAMPLE 23

This example shows an embodiment of a curable composition obtained by compounding the epoxidized copolymer of the present invention with a compound having carbon-carbon double bond. 100 parts of the epoxidized product (epoxy equivalent, 227) of acetylene-butadiene random copolymer (acetylene content 32.2 mol%, block character P 1.00, number average molecular weight 2,370), 0.03 parts (as weight of metal component) of cobalt naphthenate and 20 parts of styrene were compounded and the resulting composition was coated on a glass plate in 30 $\mu$ thickness and cured in air at 120°C. The drying touch time of the sample was about 3 minutes and the composition was cured completely after about 15 minutes.

EXAMPLE 24

The composition obtained by compounding 100 parts of the epoxidized random copolymer as used in Example 22 with 20 parts of 1,2-polybutadiene (number average molecular weight, 1,130) was coated on a glass plate in 30 $\mu$ thickness and cured in air at 100°C.

The drying touch time of the sample was about 2.5 hours and the composition was cured completely after about 3.5 hours.

EXAMPLE 25

To the composition as used in Example 24, 0.03 parts (as weight of metal component) of cobalt naphthenate was compounded and the resulting composition was cured in the same manner as described in Example 24. The drying touch time of the sample was about 5 minutes and the composition was cured completely after about 20 minutes.

EXAMPLE 26

100 parts of an epoxidized product (epoxy equivalent, 221) of acetylene-butadiene random copolymer (acetylene content 23.7 mol%, block character P 0.97, number average molecular weight, 1,840) was compounded with 25.0 parts of resorcinol and the resulting composition was casted into a slab mold in the depth of 3 mm and cured at 130°C. The sample was gelled in 15 minutes and post cure was effected for 20 hours. A hard resinous cured product was obtained.

EXAMPLE 27

The same experiment was effected according to Example 26 except that 30 parts of glutaric acid instead of resorcinol was used and 100°C of cure temperature was employed instead of 130°C. The sample was gelled in 10 minutes and the post cure was effected for 20 hours. A hard resinous cured product was obtained.

EXAMPLE 28

The same experiment was effected according to Example 26 except that 30 parts of melamine resin (it has molecular weight of about 1,600, about 4 triazine rings per one molecule and about 3 hydroxyl groups per one triazine ring) was used instead of resorcinol.

The sample was gelled in 50 minutes and the post cure was effected for 20 hours.

A rubbery cured product was obtained.

EXAMPLES 29 –30

These examples show the curable compositions in which both effects of curing for epoxy group and oxidation cure can be attained.

Each of compositions obtained by compounding 100 parts of epoxidized acetylene-butadiene copolymer used in Example 11 (epoxy equivalent 215) with 31.6 parts of m-xylylenediamine or 35.8 parts of hexahydrophthalic anhydride was coated on aluminum plate in 30 $\mu$ thickness and cured at 100°C while absorbing oxygen in air.

The both samples had the drying touch time of about 30 minutes and were cured completely in about 1 hour to yield excellent coated film. The amount of absorbed oxygen of the film was about 15 to 20 weight percent.

COMPARATIVE EXAMPLES 13 –14

Each of the compositions obtained by compounding 100 parts of epoxidized cis-1,4-polybutadiene with 36.8 parts of m-xylylenediamine or 41.6 parts of hexahydrophthalic anhydride was coated on aluminum plate in 30 $\mu$ thickness and was cured at 100°C while absorbing oxygen in air.

The former composition did not show drying touch even after 4 hours. The latter composition ultimately showed drying touch after 3 hours.

These results show how easily the compositions of Examples 29 and 30 cured in comparison with those of Comparative Examples.

EXAMPLE 31

This example shows when a promotor for oxidation cure is compounded to the curing system where the curing through a curing agent for epoxy group and the curing through oxygen are used. 100 parts of product (epoxy equivalent, 221) of acetylene-butadiene random copolymer (acetylene content 23.7 mol%, block character P 0.97, number average molecular weight 1,840) was compounded with 30.9 parts of m-xylylenediamine and 0.01 parts (as weight of metal component) of cobalt naphthenate and the resulting composition was coated on a glass plate in 30 $\mu$ thickness and cured at 100°C in air.

The composition had the drying touch time of about 30 minutes and cured completely after 90 minutes to yield lustrous excellent coated film.

EXAMPLE 32

The composition obtained by compounding 100 parts of the epoxidized acetylene-butadiene random copolymer used in Example 31, 30.9 parts of m-xylylenediamine and 10 parts of pigment (Watchung Red) was casted into a slab mold of 3 mm depth and cured at 100°C.

The composition was gelled after about 100 minutes. A resinous cured plate was obtained after post cure of 20 hours.

EXAMPLE 33

The same experiment was carried out according to Example 32 except that 30 parts of calcium carbonate was used as pigment. The composition was gelled after about 100 minutes. A resinous cured plate was obtained after post cure of 20 hours.

EXAMPLE 34

The same experiment was carried out according to Example 32 except that 35 parts of hexahydrophthalic anhydride and 10 parts of silica gel (60 to 200 meshes) as a filler were compounded to the epoxidized copolymer.

The composition was gelled at 100°C after about 25 minutes. A resinous plate was obtained after post cure of 20 hours.

EXAMPLE 35

The same experiment was carried out according to Example 32 except that 22.3 parts of maleic anhydride and 5 parts of styrene oxide were compounded as reactive diluents to the epoxidized copolymer.

The composition was gelled at 100°C after about 5 minutes. A resinous plate was obtained after post cure of 20 hours.

What is claimed is:

1. An epoxidized acetylene-conjugated diene random copolymer of which epoxy equivalent is within the range of from 50 to 1,000, produced by epoxidizing an acetylene-conjugated diene random copolymer, in which acetylene and conjugated diene are bonded linearly and randomly, the block character P is within the range of from 0.8 to 1.2 and the acetylene content is less than 60 mol% with an organic peracid.

2. An epoxidized acetylene-conjugated diene random copolymer according to claim 1, in which the conjugated diene is butadiene.

3. An epoxidized acetylene-conjugated diene random copolymer according to claim 1, in which the conjugated diene is isoprene.

4. A curable epoxidized acetylene-conjugated diene random copolymer composition which comprises 100 parts of the epoxidized acetylene-conjugated diene copolymer of claim 1 and from 0.001 to 1,000 parts of curing agent selected from the group consisting of the curing agent for epoxy group and the promotor for oxidation cure.

5. A curable epoxidized acetylene-conjugated diene random copolymer composition according to claim 4, in which the conjugated diene is butadiene.

6. A curable epoxidized acetylene-conjugated diene random copolymer composition according to claim 4, in which the conjugated diene is isoprene.

* * * * *